March 27, 1956  J. E. WILLIAMS  2,740,043

ELECTRONIC LINEAR SWEEP GENERATOR

Filed March 3, 1952

*INVENTOR.*

*John E. Williams*

United States Patent Office 2,740,043
Patented Mar. 27, 1956

2,740,043

ELECTRONIC LINEAR SWEEP GENERATOR

John E. Williams, Linwood, N. J.

Application March 3, 1952, Serial No. 274,640

11 Claims. (Cl. 250—27)

The present invention relates to an electronic linear sweep generator utilizing the constant plate current of a pentode to charge a capacitor at a desired constant rate.

In the known art, cathode ray tube sweep generators have employed two general methods in generating a time-base sweep voltage. In the first method a capacitor is charged through a high resistance and an exponentially-variable time-base sweep voltage is developed, approximating a linearly-variable sweep voltage only over a limited initial portion of its variable range. The second method employs a full-wave arrangement of two pentodes, two thyratrons and a capacitor connected between the two pentode cathodes, the two thyratron cathodes being connected to ground, the two pentode plates being connected to a common positive energizing terminal, and the capacitor being charged successively in opposite sense and at linear rates as the thyratrons fire alternately. The second method suffers by requiring two independent battery-supplied screen-grid voltage sources, and also, twice per cycle, importantly suffers by including abrupt and substantial changes of the midpoint potential of the generated sweep voltage, this change of mid-point potential being productive of objectionable "birdies" in the trace of a related cathode ray tube.

The major object of the present invention is to provide a linear sweep generator in which the disadvantages referred to above are substantially avoided.

Another object of this invention is to provide a linear sweep generator capable of operation down to frequencies such as 100 seconds per cycle and a related direct-coupled device converting the half-wave generated sweep voltage to a full-wave sweep voltage symmetrical with respect to a substantially constant conversion midpoint potential.

According to the present invention there is provided a voltage generating array energized by a first reference voltage and comprising a capacitor and a charging control pentode arranged to charge the capacitor at desired linear rates and to generate a linearly-variable half-wave voltage thereacross, also comprising a capacitor discharge tube and a discharge control pentode arranged to discharge the capacitor at desired values of generated voltage and to combine with the capacitor and charging control pentode in forming a recurrent linearly-variable half-wave saw-tooth sweep voltage, and further comprising a limiter tube arranged to arrest generation of voltage across the capacitor, as desired, thereby selectively providing a single-cycle half-wave linearly-variable saw-tooth sweep voltage for photographic observation or for other purposes.

According to the present invention there is also provided a conversion array energized by a second reference voltage and comprising first and second conversion triodes, a conversion pentode and an equalizing pentode arranged in a related direct-coupled network to effect conversion of the half-wave sweep voltage as generated to a full-wave sweep voltage symmetrical with respect to a substantially constant conversion midpoint potential, and also selectively comprising a transfer triode arranged to economize in the supply of the second reference voltage.

Before proceeding to a detailed description of the present invention let it first particularly be noted that with the control-grid, screen-grid and suppressor grid potentials of a pentode held constant each with respect to cathode potential, the plate or anode current of a pentode is substantially independent of plate voltage. Accordingly and within wide limits the linear rate of voltage generation across a capacitor being charged by the constant plate current of a pentode is not disturbed by the periodic discharge of that capacitor, as for instance during the generation of a saw-tooth sweep voltage. Also accordingly the constant plate current of a pentode, acting to stabilize the control-grid potential of a capacitor-discharging thyratron, also desirably acts to suppress thyratron grid current during the firing portion of a thyratron cycle. And finally the voltage drop across a plate load resistor related to a pentode so operating is substantially constant, and changes in potential occurring at the positive terminal of plate supply voltage are transferred to the pentode plate with substantial exactness and without introducing loss of transit time, as for example in effecting conversion of a half-wave voltage to a symmetrical full-wave voltage.

Other and further objects of this invention will be understood from the specification hereinafter following by reference to the accompanying drawing in which.

In order that this invention may clearly be understood and readily placed in effect it will now more fully be described with reference to preferred illustrative embodiments thereof as shown in the several figures wherein like circuit characters refer to like parts or circuit points of like relationship, and wherein triple-pole double-throw transfer switch, $S_T$ (including $S_T'$ and $S_T''$) is utilized to effect economy in descriptive schematic circuit diagrams.

Figure 1:
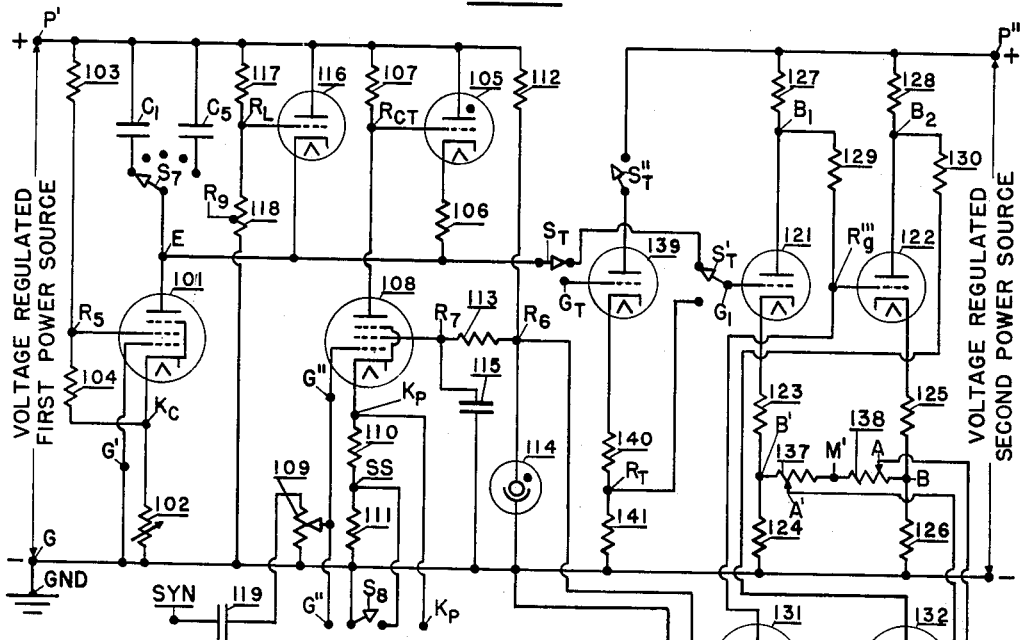
Fig. 1 is a schematic circuit diagram of a linear voltage-generating array and of a conversion array direct-coupled thereto.

Referring now to Fig. 1, first and second voltage-regulated direct-current power sources are indicated with a common negative terminal connected at circuit point G to ground potential GND, circuit point G being the common negative energizing terminal of a voltage generating array and of a conversion array and having primary reference potential particular thereto.

Circuit character P', connected to the positive terminal of the first power source, hereinafter referred to as $E_1$, indicates the positive energizing terminal of the voltage generating array and has first reference potential P' particular thereto as distinguished from primary or ground reference potential.

Circuit character P'', connected to the positive energizing terminal of the second power source, indicates the positive energizing terminal of the conversion array and has second reference potential P'' particular thereto as established by second reference supply voltage $E_2$.

Circuit characters $C_1$ and $C_5$ respectively indicate individual capacitors of a plurality of frequency-step capacitors, each capacitor having a reference terminal energized by connection to circuit point P' and each capacitor having the opposite or "generated-voltage" terminal thereof respectively connected to one of a plurality of frequency-step-selector terminals of frequency-step selector switch $S_7$, capacitor $C_1$ being shown activated by connection as above described. The selector arm of switch $S_7$ is connected at circuit point E to the plate of charging-control pentode 101, circuit point E having variable potential $P_E$ particular thereto.

Circuit character 101 indicates a pentode having a plate or anode terminal E, a screen-grid terminal $R_5$, a control-grid terminal G', and a cathode terminal $K_C$, the suppressor-grid thereof being connected to the cathode thereof. Pentode 101 is substantially self-biased by connection of control-grid terminal G' to circuit point G and by connection to cathode terminal $K_C$ through manually-variable resistor 102 to circuit point G, the plate thereof being energized by connection at circuit point E through the activated frequency-step capacitor to circuit point P', the screen-grid thereof being energized by connection at circuit point $R_5$ through voltage-dropping resistor 103 to circiut point P', and a substantial biasing current being maintained therethrough and through biasing resistor 102 at low orders of pentode cathode current by connection of bleeder resistor 104 between circuit points $R_5$ and $K_C$.

For each adjustment of variable resistor 102, the suppressor-grid, screen-grid and control-grid voltages of pentode 101 are held constant and the plate current of pentode 101 is held constant in magnitude and substantially independent of plate voltage, thereby charging the activated frequency-step capacitor at a desired constant rate and effecting generation of a linearly-variable half-wave voltage $e_g'$ across the terminals of the activated frequency-step capacitor, as for example between circuit points P' and E or equivalently a linearly-variable half-wave voltage $e_G$ between circuit points G and E.

Figures 1A, 1B:
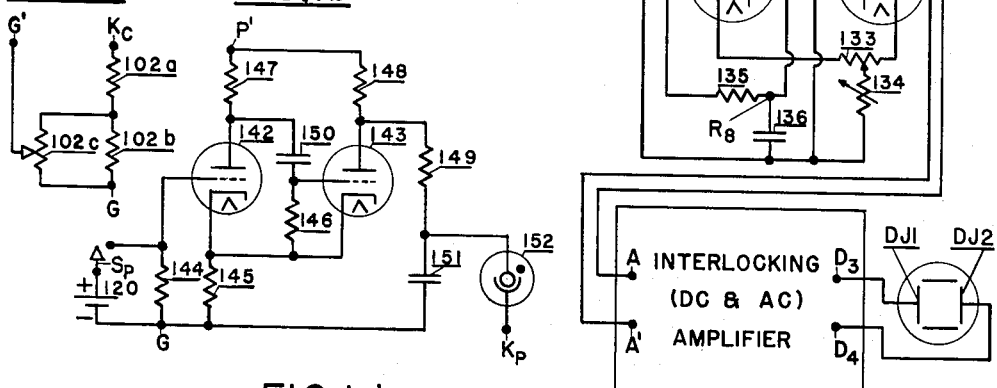
Fig. 1a is a schematic circuit diagram showing improved means for the control of fine frequency adjustment.
Fig. 1b is a schematic circuit diagram showing means for pulsing a single-sweep cycle of generated voltage, an electronic time delay being included to ensure full opening of a camera shutter prior to initiating the generation of sweep voltage.

Accordingly pentode 101, connected and energized as above described, is hereinafter referred to as a "charging-control pentode," and variable resistor 102 or its functional equivalent as disclosed in Fig. 1a is hereinafter referred to as "verniered resistive means" controlling fine frequency adjustment.

Circuit character 105 indicates a grid-controlled gaseous discharge tube, or a high vacuum "hard-tube" equivalent, functioning as a capacitor-discharge tube, having the anode thereof connected to circuit point P', having the cathode thereof connected through protective-resistor 106 to circuit point E, having the control-grid thereof connected at circuit point $R_{CT}$ with thyratron control potential $P_{CT}$ particular thereto, establishing a substantially constant anode-to-cathode voltage drop $E_{TO}$ during the conducting portion of its cycle, and, as the conducting portion of its cycle closely approaches termination, establishing between circuit point P' and E a "zero time" voltage drop $e_0'$ substantially equalling $E_{TO}$ thereby providing an upper potential reference limit $P_0$ for voltage generated between P' and E. Having completed, at zero time, the conducting portion of its cycle, the anode-to-cathode voltage drop $e_1'$ at which capacitor discharge tube 105 initiates a conducting portion of its cycle is critically related to control potential $P_{CT}$ and provides a recurrent potential limit $P_{REC}$ of generated voltage $e_G$. For example, and with $P_{CT}$ fixed, $$E_G = P_0 - P_{REC}$$

Sweep voltage generated as above described is half-wave in character by reason of fixation of $P_0$, is saw-tooth in form by reason of abrupt and exponential change of $P_E$ during the brief conducting portion of the capacitor-discharge-tube cycle, importantly varies linearly with respect to time during the non-conducting portion of the capacitor-discharge tube cycle, and has the frequency of cycle recurrence determined; inversely by the magnitude of $E_G$ in response to $P_{CT}$, inversely by the capacity of the activated frequency-step capacitor, and directly by the magnitude of plate current of the charging-control pentode in response to verniered resistive means controlling fine frequency adjustment. Further, with the recurrence frequency of $e_g$ adjusted approximately to, but less than, the frequency of an observed signal, as in fixation of a cathode ray tube recurrent pattern, the recurrence frequency of $e_g$ may be increased to synchronism with the frequency of the observed signal by suitably and periodically superimposing on $P_{CT}$ small-magnitude positive potential excursions or pulses, as hereinafter provided. Still further and anticipating the desirability of holding a cathode ray tube spot of constant intensity off the fluorescent screen as in preparation for a single sweep of long duration, the magnitude of $E_G$ may be increased, by limiting means hereinafter provided, establishing a second lower potential limit $P_{ss}$ of generated voltage and by simultaneously and effectively lowering critical potential $P_{CT}$, by other discharge-tube control means also hereinafter provided. The generation of voltage having been arrested at the second or extended lower potential limit $P_{ss}$, the single sweep cycle of generated voltage may be initiated by superimposing a positive pulse of short duration on the lowered critical control potential $P_{CT}$ by pulsing means also hereinafter provided.

Circuit character 107 indicates a voltage dropping resistor connected between circuit points P' and $R_{CT}$, having the plate current of discharge-control pentode 108 flowing therethrough and establishing at circuit point $R_{CT}$ a thyratron (or capacitor-discharge-tube) control potential $P_{CT}$ critically related to the anode-to-cathode potential difference at which capacitor-discharge tube 105 initiates the conducting portion of its cycle, two values of discharge-tube critical control potential $P_{CT}$ being selectively established by two optional magnitudes of plate current of discharge-control pentode 108 respectively corresponding to $P_{REC}$ and a potential just below $P_{ss}$, a synchronization in the case of a recurrent sweep voltage and initiation of a single sweep cycle being accomplished by modulation of the plate current of discharge-control pentode 108. Voltage dropping, or discharge-tube-control, resistor 107, connected and energized as described above, also importantly stabilizes thyratron operation during the conducting portion of its cycle by limiting control-grid-to-cathode current and by denial of anode-to-control-grid current by virtue of the constant magnitude of discharge-control-pentode 108 plate current with independence from plate voltage hereinafter provided.

Circuit character 108 indicates a pentode functioning as a discharge-control pentode arranged fundamentally to provide a constant magnitude of plate current therethrough with substantial independence from the influence of variable plate voltage thereacross, having the suppressor-grid thereof connected to the cathode thereof, having a control-grid terminal G'', having a screen-grid terminal $R_7$, and having a plate or anode terminal $R_{CT}$, being self-biased by connection of control-grid terminal G'' through the moveable arm and a variable resistive portion of synchronizing potentiometer 109 to circuit point G and by connection of cathode terminal $K_P$ through series-connected biasing resistors 110 and 111 to circuit point G, being energized by connection of plate terminal $R_{CT}$ through discharge-control resistor 107 to circuit point P' and by connection of screen-grid terminal $R_7$ through voltage dropping resistors 113 and 112 to circuit point P', cathode terminal $K_P$ being common with voltage generating array single sweep pulsing terminal $K_P$. Biasing resistors 110 and 111 are series-connected at circuit point SS, the opposite end of resistor 110 being connected to circuit point $K_P$ and the opposite end of resistor 111 being connected to circuit point G. Filter resistor 113 and voltage dropping resistor 112 are series-connected at circuit point $R_6$, the opposite ends of resistor 113 and 112 being respectively connected to circuit points $R_7$ and $P'$.

Circuit character 114 indicates a voltage-regulating cold-cathode gaseous discharge tube stabilizing the potential at circuit point $R_6$ and stabilizing the voltage between circuit points $R_6$ and G, screen-grid supply voltage of pentode 108 being further stabilized by connection of filter capacitor 115 between circuit points $R_7$ and G.

Discharge control pentode 108, connected and energized as above described, and having a cathode, control-grid, screen-grid and suppressor-grid at fundamentally fixed relative potentials, is characterized by a fundamentally constant magnitude of plate current therethrough with substantial independence from operational variation of plate voltage thereacross and corresponding to recurrent lower potential limit $P_{REC}$ of generated voltage $e_g$.

Circuit character $S_8$ indicates a two position single-sweep control switch having the moveable arm thereof connected to circuit point G, being shown in the open-circuit or recurrent sweep position, and having a closed-circuit or single-sweep selector terminal connected to circuit point SS optionally short-circuiting biasing resistor 111 thereby establishing a second fundamentally constant magnitude of pentode 108 plate current maintaining $P_{CT}$ just below the discharge tube control-grid critical potential corresponding to $P_{ss}$. With single sweep control switch $S_8$ in the closed circuit or single sweep position, pentode 108 plate current may effectively be modulated and the single-sweep cycle be "triggered" by a positive pulse impressed on pulsing terminal $K_p$.

Circuit character 109 indicates a synchronizing control potentiometer with the moveable arm thereof connected to circuit point $G''$, with one end of the resistance element thereof connected to circuit point G, and with the opposite end of the resistance element thereof connected to one terminal of isolating and coupling capacitor 119, the opposite terminal of capacitor 119 being connected to sweep generator synchronizing terminal SYN, thereby providing synchronizing means responsive to periodically recurrent negative pulses impressed on terminal SYN and modulating discharge-control-pentode plate current in effective synchronizing control of the recurrent lower limit potential $P_{REC}$ of generated voltage $e_g$. It will be understood that the synchronizing means above described may alternatively be utilized to "trigger" a single-sweep cycle.

Circuit characters 117 and 118 respectively indicate component resistors of a potential dividing network series-connected at circuit point $R_L$, the opposite end of resistor 117 being connected to circuit point $P'$ and the opposite end of resistor 118 being connected to circuit point G, circuit point $R_L$ having limiter reference potential $P_L$ particular thereto, and resistor 118 having a variable tap $R_9$ with a heater reference potential $P_9$ particular thereto.

Circuit character 116 indicates a limiter triode, inoperative during generation of a recurrent sweep voltage and functioning (with single-sweep selector switch $S_8$ in the single sweep selector position) to arrest generation of sweep voltage by diversion of charging-control-pentode plate current from passage through the activated frequency-step capacitor to passage as anode current through limiter triode 116, the anode thereof being connected to circuit point $P'$, the cathode thereof being connected to circuit point E, and the control-grid thereof being connected to circuit point $R_L$ and responsive to limiter reference potential $P_L$ thereby establishing lower potential limit $P_{ss}$ of generated voltage $e_g$.

Circuit character 139 indicates a transfer triode having the anode thereof optionally energized by optional connection to circuit point $P''$, having the control-grid terminal $G_T$ thereof optionally excited by optional connection to circuit point E, and having the cathode thereof connected through voltage-dropping resistors 140 and 141 to circuit point G, resistors 140 and 141 being series-connected at transfer reference point $R_T$, the opposite end of resistor 140 being connected to the cathode of transfer triode 139 and the opposite end of resistor 141 being connected to circuit point G.

Circuit characters $S_T$, $S_T'$ and $S_T''$ respectively indicate component switches of a three-pole double-throw transfer switch having first and second optional positions, being shown in the first optional position exciting circuit point $G_1$ of the conversion array by connection thereof to circuit point E of the voltage generating array and deenergizing all electrodes of transfer triode 139, and when optionally thrown to the second optional position energizing the anode of transfer triode 139 by connection thereof to circuit point $P''$, exciting the control-grid thereof by connection of circuit point $G_T$ to circuit point E, and exciting the control grid of first conversion triode 121 by connection of circuit point $G_1$ to transfer reference point $R_T$.

Circuit characters 121 and 122 respectively indicate first and second conversion triodes, respectively having anode terminals $B_1$ and $B_2$, respectively having control-grid terminals $G_1$ and $R_g'''$, respectively having equal plate load resistors 127 and 128 respectively connected to circuit points $B_1$ and $B_2$ and respectively energized by connection of the respective opposite ends thereof to circuit point $P''$, respectively having the cathodes thereof connected to circuit point G through equal first and second resistive paths, triodes 121 and 122 being similar triodes, first conversion triode 121 cathode resistive path comprising resistors 123 and 124 series-connected at circuit point $B'$ and with the opposite ends thereof respectively connected to the cathode of first conversion triode 121 and circuit point G, second conversion triode 122 cathode resistive path comprising resistors 125 and 126 series-connected at circuit point B and with the opposite ends thereof respectively connected to second conversion triode 122 cathode and circuit point G, resistors 123 and 125 being equal resistors, resistors 124 and 126 being equal resistors, and the value of plate load resistor 127 being made equal to the sum of the values of cathode resistors 123 and 124 divided by the voltage gain of triode 121 taken between the cathode of triode 121 and circuit point G.

Circuit characters 131 and 132 respectively indicate a conversion pentode and an equalizing pentode with the suppressor-grids thereof respectively connected to the respective cathodes thereof, with the control-grids thereof connected to circuit point G, with the cathodes thereof respectively connected to opposite ends of the resistive element of "position control" potentiometer 133, pentodes 131 and 132 being adjustably self-biased by connection of the moveable arm of position control potentiometer 133 through variable biasing resistor 134 to circuit point G, the screen-grids thereof being jointly connected to reference point $R_8$ and being energized by connection of reference point $R_8$ through voltage-dropping filter resistor 135 to stabilized voltage reference point $R_6$, screen-grid supply voltage being further stabilized by connection of filter capacitor 136 between circuit points $R_8$ and G, the anode of conversion pentode 131 being energized by connection at circuit point $R_g'''$ through voltage-dropping conversion resistor 129 to circuit point $B_1$ and the anode of equalizing pentode 132 being symmetrically energized by connection through voltage dropping resistor 130 to circuit point $B_2$.

With potentiometer 133 and biasing resistor 134 adjusted to provide equal average potential levels at symmetrical control-grid terminals $G_1$ and $R_g'''$, conversion pentode 131 and equalizing pentode 132 each respectively having a cathode, control-grid, screen-grid and suppressor-grid at fixed relative potentials, respectively and with substantial independence from the effects of changes in plate voltage provide anode currents of constant magnitude, conversion pentode 131 thereby functioning to provide pentode means effecting substantially exact transfer of amplified voltages occurring at circuit point $B_1$ and at the average potential level of circuit point $B_1$ from circuit point $B_1$ to circuit point $R_g'''$, and at the average potential level of circuit point $R_g'''$, and equalizing pentode 132 thereby functioning to provide means equalizing the average voltage drops respectively occurring across resistors 127 and 128. It will be understood that the pentode means and equalizing means above referred to remain effective over a wide range of adjustment of position control potentiometer 133. It will also be understood that a filter capacitor may be shunted across conversion resistor 129 to preclude amplification of microphonic and Shott-effect voltages originating in conversion pentode 131.

The conversion array being energized and excited as described above functions to convert the half-wave linearly-variable sweep voltage generated in the voltage generating array into a linearly-variable full-wave sweep voltage established between circuit points B and B' symmetrical with respect to a substantially constant midpoint potential.

Circuit characters 138 and 137 respectively indicate component potentiometers of a dual gain-control potentiometer, the resistance elements thereof being series-connected at total resistance midpoint M' and the opposite ends of the resistance elements thereof being energized by respective connection to circuit points B and B', circuit point M' thereby having a substantially constant midpoint potential, the moveable arms thereof respectively constituting conversion array output terminals A and A' being ganged to provide movement in unison toward or away from circuit point M'.

A linear interlocking D. C. amplifier of negligible phase-shift is indicated, having amplifier signal input terminals A and A' respectively connected to conversion output terminals A and A', and having amplifier output terminals $D_3$ and $D_4$ respectively connected to cathode ray tube time base deflecting electrodes DJ1 and DJ2 thereby providing a linearly variable deflection of the cathode ray tube spot with substantial freedom from "birdies" or random "spot" deflections normally resulting in "hangover" fashion from abrupt variation of the instantaneous average potential at deflecting electrodes DJ1 and DJ2 of conventional cathode ray tube energizations.

Referring now to Fig. 1a, equivalent and preferred verniered means controlling fine frequency adjustment is disclosed, having terminals G, G' and $K_c$ for alternate connection to like identified circuit points of Fig. 1, resistances 102a, 102b and 102c replacing biasing resistor 102, circuit point G' being connected to circuit point G through a variable portion of potentiometer 102c, protective resistor 102a providing a biasing voltage limit, and shunting resistor 102b diverting a substantial portion of biasing current from potentiometer 102c.

Referring now to Fig. 1b, pulse-generating means including primary and secondary electronic time delays and a gaseous discharge tube is disclosed having terminals G, P' and $K_p$ for operational connection to like identified terminals of Fig. 1. Circuit characters 142 and 143 respectively indicate first and second similar triodes having the cathodes thereof joined at a common electrical junction, having the anodes thereof respectively energized by connection through first and second plate load resistors 147 and 148 to circuit point P', having the first triode control-grid connected through first grid resistor 144 to circuit point G, having the second triode control-grid connected through second grid resistor 146 to second triode cathode, and having the common electrical junction of first and second triode cathodes connected through biasing resistor 145 to circuit point G, second triode plate current flowing through biasing resistor 145 thereby normally holding the first triode control-grid biased below cut-off.

Circuit characters 149 and 151 respectively indicate a resistor and a primary capacitor, resistor 149 and primary capacitor 151 being series-connected, the opposite end of resistor 149 being connected to second-triode anode and the opposite terminal of primary capacitor 151 being connected to circuit point G thereby generating a direct-current voltage across primary capacitor terminals.

Circuit character 152 indicates a cold-cathode gaseous discharge tube having the anode thereof connected to the positively charged terminal of primary capacitor 151, having the cathode thereof operatively connected at circuit point $K_p$ through biasing resistor 110 (of Fig. 1) and operatively closed selector switch $S_8$ to circuit point G, the voltage drop across second plate load resistor 148 normally holding the D. C. voltage generated across primary capacitor 151 to a value less than the critical "firing" voltage of gaseous discharge tube 152.

Circuit character 150 indicates a secondary capacitor connected between first triode anode and second triode control grid, capacitor 150 functioning as a D. C. blocking capacitor in denying a direct current path between first triode anode and second triode control-grid, also functioning as an A. C. coupling capacitor between first triode anode and second triode control-grid, capacitor 150 being normally inactive.

Circuit character 120 indicates a battery, as for instance the flash energizing battery related to a camera, with the negative terminal thereof connected to circuit point G and with the positive terminal thereof connected to the movable arm of pulse control switch $S_p$ having an open-circuit or inactive position also having a closed-circuit or active position, the active position selector terminal of pulse-control switch being connected to the first triode control-grid.

The values of circuit components are chosen to provide the following pulse generator performance, effective on closure of pulse control switch $S_p$. The first triode abruptly becomes conducting thereby generating an abrupt voltage drop across plate load resistor 147 intimately related to first triode anode potential and constituting an A. C. voltage transient, negative in character. The above negative A. C. voltage transient is transferred, through the agency of coupling capacitor 150, to the second triode control-grid thereby biasing the second triode below cut-off. With second triode anode current thus reduced to zero, the voltage drop across second triode plate load resistor 148 is substantially reduced thereby enabling primary capacitor 151 to be charged to the critical firing voltage of gaseous discharge tube 152, and involving a desired principal time delay, as for instance 0.004 second required for one particular camera shutter to be fully opened. As its critical firing voltage is reached, gaseous discharge tube 152 fires and significantly discharges capacitor 151 by a sharp and heavy current pulse which passes through resistor 110 (of Fig. 1) modulating the anode current of pentode 108 thus triggering capacitor discharge tube 105, and initiating the desired single sweep cycle of the voltage generating array. Generation of the above single heavy current pulse and denial of consequent recurrent heavy current pulses through resistor 110 is dependent on a secondary time delay related to coupling capacitor 150 and its associated resistive path, the secondary time delay during which capacitor 150 discharges to a voltage thereacross permitting second triode 143 again to become conducting being required to at least equal the desired primary time delay and to be substantially less than twice the desired time delay.

Figures 1C, 1D:
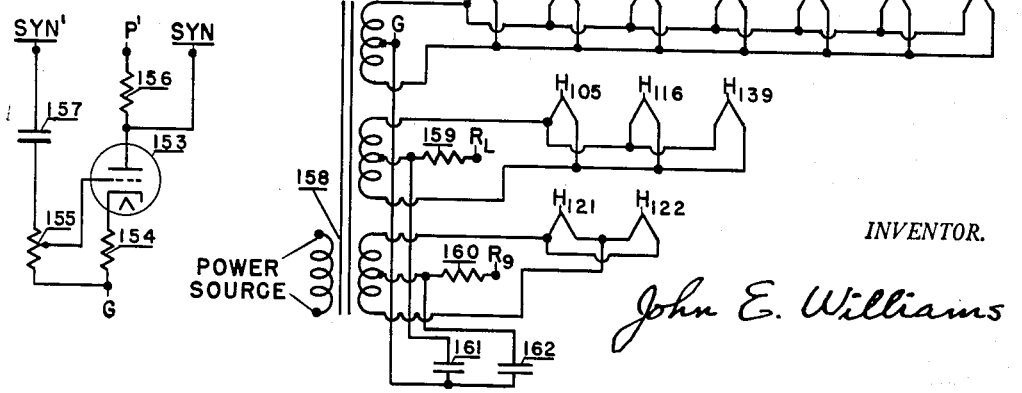
Fig. 1c is a schematic circuit diagram showing conventional additional means for synchronizing the positive potential excursion of an observed recurrent signal.
Fig. 1d is a schematic circuit diagram showing conventional, but not restrictive, means energizing the heating elements of component electronic tubes.

Referring now to Fig. 1c, conventional and enabling inverter means are shown having terminals G, P' and SYN for optional connection to like identified terminals of Fig. 1, also having terminal SYN' for synchronizing connection, as desired, to an observed signal voltage increasing in a positive sense. The enabling conventional means herein cited additionally comprise; inverter triode 153, self-biasing resistor 154, plate load resistor 156, control-potentiometer 155 and blocking capacitor 157. It will be understood that stable high-gain D. C. amplifiers are usually of the full-wave type and include both positive and negative amplified voltage reference points for actuating synchronism as desired.

Referring now to Fig. 1d, conventional but not restrictive means is shown energizing the heater elements of component electronic tubes of Fig. 1. An A. C. power source is indicated. Circuit character 158 indicates a heater transformer having a plurality of center-tapped secondary windings. Circuit characters 159 and 160 indicate filter resistors and circuit characters 161 and 162 indicate filter capacitors. Circuit characters G, $R_L$ and $R_9$ respectively indicate terminals operationally connected to like indicated terminals or circuit points of Fig. 1. Circuit characters $H_{101}$, $H_{108}$, $H_{131}$, $H_{132}$, $H_{142}$, $H_{143}$, $H_{153}$, $H_{105}$, $H_{116}$, $H_{139}$, $H_{121}$ and $H_{122}$ respectively indicate the heater elements of component electronic tubes respectively indicated by subscript notation.

What I claim is:

1. In a direct-coupled linear sweep generator supplied from a regulated power source having upper and lower voltage terminals, condenser means connected at one side to said upper terminal for storage of a sweep voltage thereon, an output terminal connected to the other side of said condenser means, pentode means for charging said condenser means at a constant current rate irrespective of the voltage thereon being connected between said lower and said output terminals, thyratron triggering means discharging the condenser at the end of a linear charging time selectable by variation of grid voltage thereat, a pentode tube connected between the upper and lower terminals and having grid, screen grid and cathode at fixedly adjusted relative potentials for rendering pentode plate current independent of plate voltage, said tube having an anode circuit resistor connecting said upper terminal to said tube at a junction the potential whereof is connected for stabilizing control of said thyratron triggering means, and said tube having a cathode circuit resistor connecting said lower terminal to said tube, means stabilizing a potential between the potentials on said upper and lower terminals, the stabilized potential being applied to an intermediate control element of said tube thereby to stabilize the triggering means, and means varying said fixedly adjusted relative potentials thereby altering the condenser voltage at which said thyratron initiates discharge.

2. In the sweep generator of claim 1 said pentode means having an anode connected to said output terminal, a control grid connected to said lower terminal, a cathode connected through a manually variable resistance to said lower terminal and a screen grid connected to regulated voltage dividing means said regulated voltage dividing means connected between said upper terminal and said cathode, the dividing means current providing pentode means bias voltage at low charging currents, said manually variable resistance being means to control the value of constant current applied for charging the condenser means.

3. In the sweep generator of claim 1 a triode tube connected with a cathode thereof at the potential of the output terminal, an anode thereof at the potential of the upper terminal and a grid thereof at fixed potential between the potentials of said upper and lower terminals, said fixed potential being adjusted to a predetermined value whereby current supplied from said pentode means after voltage across the condenser means has reached a designated value is by-passed through said triode tube and the sweep generator voltage is limited at a fixed value of potential above operating potential for said triggering means.

4. In the generator according to claim 3 mono-stable multivibrator means constructed and arranged to apply a pulsed change of bias on said pentode tube thereby to effect change of conductivity thereof for single and recurrent cycling of the generator last said means including a condenser charging during an unstable conduction portion of the multivibrator cycle and discharging through gas diode means, said discharge effecting said change of conductivity after a delay period corresponding to said charging portion.

5. In an electrical apparatus including a signal source, a push-pull-conversion device comprising, first and second like amplifiers each having control, current entrant and current exit elements, said amplifiers being separately energized through signal-responsive like current entrant impedances from a common supply and through separate like exit impedances to an opposite terminal of said common supply, said control elements of the amplifiers having exciting voltages of equal magnitude and opposite phase controlled by connection of the first amplifier control element to said signal source and by connection of the second amplifier control element to voltage-transferring means including a pentode biased to constant conduction and supplied through a resistance anode-connected thereto from said current entrant element of the first amplifier, and current-dissipating means shunting said second amplifier and its associated exit impedance to quiescently equalize voltage at said amplifier current entrant elements last said means comprising a constant current pentode and series resistance similarly connected to the second amplifier and having in common with first said pentode a variable earthing resistive connection and means adjusting relative currents fed therethrough for correcting inequalities elsewhere in the device.

6. A linear sweep generator comprising a regulated voltage supply having upper and lower voltage terminals, a generated voltage condenser connected at one side to said upper terminal, a pentode linear charging circuit connected to said lower terminal and the other side of said condenser, means discharging the condenser in response to an initiating signal, means limiting said discharge to an accurately repeatable potential base value on said other side of the condenser, a second regulated power supply connected at a lower terminal thereof to first said lower terminal, means comprising a pair of triodes and a pair of constant current-connected pentodes converting voltage on said condenser from single-sided to push-pull, said triodes being similarly connected from said second power supply to said lower terminal through similar resistors in the anode circuits and in the cathode circuits thereof, respectively, the first triode being grid-connected to said other side of the condenser and the second triode being grid-controlled from the anode potential of the first triode, said constant current pentodes being connected in control of said triode anode potentials, and a sweep output taken differentially between symmetrically disposed voltage points on said cathode resistors, the output voltage being thereby symmetrical about a fixed midpoint potential.

7. The sweep generator of claim 6 each said pentode of said converter means being resistively connected at an anode thereof to the lower potential end of said anode resistor of an associated said triode, both said pentodes being resistively connected at cathodes thereof to said lower terminal, the grids thereof being at fixed relative potentials, and the pentode anode currents being adjusted to averaged equality, whereby the average voltages at the anodes of the triodes are made equal while effecting conversion of signal to push-pull.

8. In a direct-coupled linear sweep voltage generator supplied from upper and lower potential terminals of a regulated voltage supply, electric charge storage means having first and second terminals the first being connected to said upper terminal, discharge control means including a control grid and connected between said upper terminal and said second terminal, pentode constant current means for charging said storage means connected between said second terminal and said lower potential terminal, said pentode means having a control grid, screen grid and cathode at fixed relative potentials and an anode at the potential of said second terminal, the control grid thereof being below cathode potential thereof, and a second pentode constant current means having relatively fixed cathode, control grid and screen grid potentials and being connected between said upper and lower terminals through resistive elements at the anode and cathode thereof, respectively, said connection at the anode being also connected to said grid of the discharge means, whereby the discharge means is actuated in response to a predetermined voltage thereacross and discharge is terminated at a fixed residual voltage on the storage means, the charging current remaining fixed throughout the cycle.

9. A variably recurrent linear sweep generator supplied from upper and lower voltage supply terminals comprising condenser means having first and second terminals for storing electric charge over a variable interval said first terminal being connected to said upper terminal, pentode means connected between said lower terminal and said second terminal of said condenser, said pentode means having an anode connected to said second terminal, a grid to said lower terminal, a screen grid at fixed potential thereinbetween and a cathode at biasing potential fixable at will to provide selective rates of linear charging of the condenser, means comprising a high current discharge device including an anode connected to said upper terminal, a cathode connected to said pentode anode and a control grid connected through a resistance to said upper terminal, and discharge control means comprising a pentode having an anode thereof connected to last said grid, a cathode resistively connected to said lower terminal, a screen grid at fixed potential thereinbetween and a grid at fixed potential difference from the cathode, said difference value controlling the sweep voltage magnitude by varying the triggering point of said discharging means.

10. Means altering said difference of potential of claim 9 after a designed time delay comprising a single shot multivibrator energized by connection thereof between said upper and lower terminals and whereof an output voltage is impressed across a series-connected resistance and condenser, the condenser being connected to said lower terminal and the series junction of last said resistance and condenser being connected through a gas diode to the cathode of last said pentode for suddenly discharging first said condenser as last said condenser is charged to a predetermined level.

11. In an electrical apparatus including a signal source, a push-pull conversion device comprising, first and second like amplifiers each having control, current entrant and current exit elements, said amplifiers being separately energized through signal-responsive like current entrant impedances from a common supply and through separate like exit impedances to an opposite terminal of said supply, said control elements of the amplifiers having exciting voltages of equal magnitude and opposite phase controlled by connection of the first amplifier control element to said signal source and by connection of the second amplifier control element to voltage-transferring means including a pentode biased to constant conduction and supplied through a resistance anode-connected thereto from said current entrant element of the first amplifier, and current-dissipating means shunting said second amplifier and its associated exit impedance to quiescently equalize voltage at said amplifier current entrant elements.

References Cited in the file of this patent
UNITED STATES PATENTS

| Number | Name | Date |
|---|---|---|
| 1,959,010 | Tellegen | May 15, 1934 |
| 2,083,202 | Schlesinger | June 8, 1937 |
| 2,114,938 | Puckle | Apr. 19, 1938 |
| 2,155,210 | Young | Apr. 18, 1939 |
| 2,246,631 | Knick | June 24, 1941 |
| 2,266,516 | Russell | Dec. 16, 1941 |
| 2,316,044 | Blair | Apr. 6, 1943 |
| 2,324,279 | Clark | July 13, 1943 |
| 2,413,063 | Miller | Dec. 24, 1946 |
| 2,416,328 | Labin | Feb. 25, 1947 |
| 2,443,864 | MacAuley | June 22, 1948 |
| 2,513,354 | Parker | July 4, 1950 |
| 2,615,063 | Brown | Oct. 21, 1952 |